Aug. 28, 1951  E. G. LINDER  2,566,089
METHOD OF AND MEANS FOR DETECTING NUCLEAR PARTICLES
Filed Sept. 17, 1948
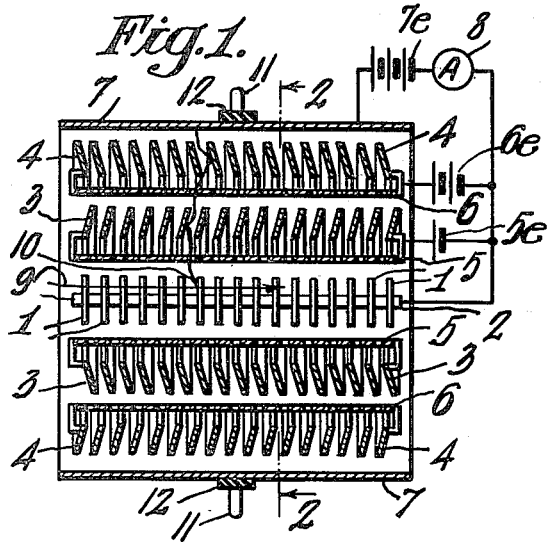
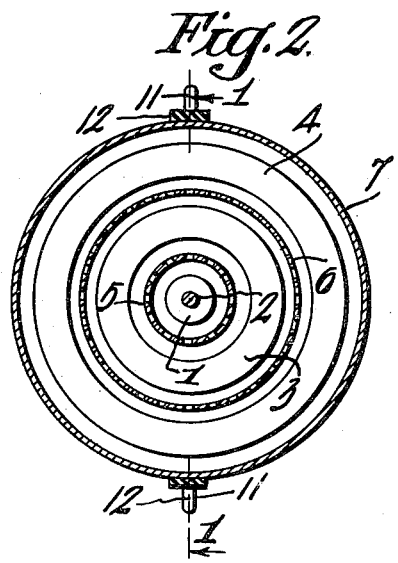
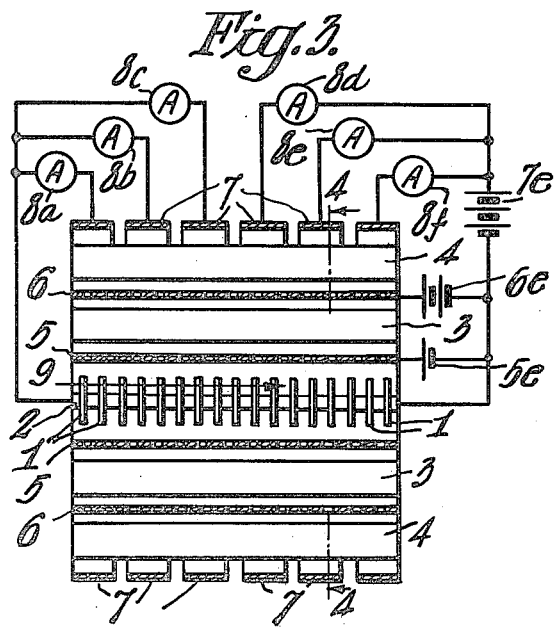
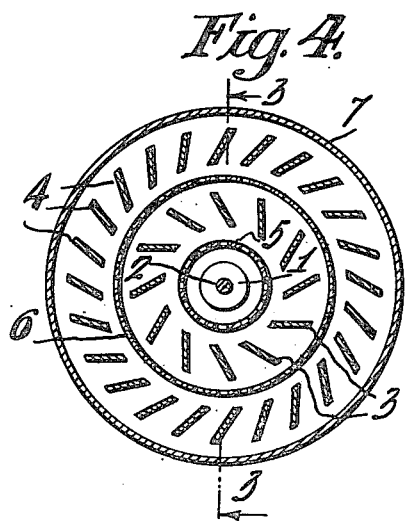
INVENTOR
Ernest G. Linder
BY
ATTORNEY Patented Aug. 28, 1951

2,566,089

UNITED STATES PATENT OFFICE 2,566,089

METHODS OF AND MEANS FOR DETECTING NUCLEAR PARTICLES

Ernest G. Linder, Princeton, N. J., assignor to Radio Corporation of America, a corporation of Delaware Application September 17, 1948, Serial No. 49,733

11 Claims. (Cl. 250—175)

This invention relates generally to fast nuclear particle detectors and more particularly to such detectors of high velocity beta rays.

It is known that certain isotopes are radioactive and emit nuclear charged particles at known rates over known periods of time and over a range of energy values or levels expressed in electron volts. Some emissions consist of positively charged or alpha particles, others of negatively charged or beta particles and others of both alpha and beta particles.

It is also known that when certain materials are subjected to nuclear radiation bombardment, a number of electrons around the nucleus of the bombarded atom are knocked out of their orbits and projected into space. This phenomenon is known as secondary emission. The number of secondary electrons emitted per bombarding particle depends in general upon the material itself and upon angle of incidence of the particle and the velocity of the bombarding particle. In general, the greater the angle of incidence and the less the velocity of the bombarding particle, the greater is the number of secondary emitted electrons.

These secondary emitted electrons have relatively low energy values compared with the primary emission values. Their further movements after leaving the bombarded surface depends upon their initial velocities and their initial random direction and upon the electrostatic and electromagnetic fields in the region where they leave the bombarded surface.

When these secondary electrons strike other secondary emission responsive materials, further secondary emissions may occur, depending upon the velocity of the electrons and the angles of incidence.

There have been available several types of beta ray detectors, such as the Geiger-Mueller counter, which depend in its operations on the ionization and conduction of the gas in the detector and the deionization of this gas before it becomes operative again for the detection of another beta particle, that is, by the gas becoming non-conductive. While this phenomenon takes place in a very short time, the period of time involved is too long for many observations desired to be made in the field of nuclear physics. Also, the Geiger-Mueller counter gives no indication of the velocity or energy for the particles, which requires other devices to determine. Further, the Geiger-Mueller counter gives no definite indications as to the direction from which the particles may be coming. Such a counter is ineffective for that purpose. The instant invention provides in one instrument the method of and means for obtaining these results.

Among the objects of the invention are the providing of improved methods of and means for detecting high velocity nuclear particles.

Another object of the invention is to provide a high velocity particle detector that depends in its operation only on secondary-emission electrons.

Another object of the invention is to provide a high velocity particle detector that is faster in action than those known heretofore.

Another object of the invention is to provide a high velocity particle detector that indicates the velocity of the particles observed.

Another object of the invention is to provide a high velocity particle detector that indicates the quantity of the particles observed.

Other objects will be apparent from the disclosure of the invention as hereinafter set forth in detail and from the drawings made a part hereof in which Figure 1 is a horizontal cross section of one embodiment of the invention, taken on line 1—1 of Figure 2; Figure 2 is the vertical cross section of the embodiment shown in Figure 1, taken on line 2—2 of Figure 1; Figure 3 is a horizontal cross section of another embodiment of the invention taken on line 3—3 of Figure 4; and Figure 4 is a vertical cross section of the embodiment shown in Figure 3, taken on line 4—4 of Figure 3.

Similar reference characters are applied to similar elements throughout the drawings.

Referring to Figures 1 and 2, there is disclosed therein a series of discs 1, 1, mounted on a rod 2, in any conventional manner. The discs 1 are extremely thin, about 0.02 mm., and are of relatively small diameter, compared with those in a Geiger-Mueller counter. They are made of aluminum and are mounted about 1 to 10 mm. apart. There are about 10 to 100 discs in the series.

Radially outward of discs 1 are two sets of vanes 3 and 4, respectively, which are mounted radially at an angle. The vanes in the device shown in Figures 1 and 2 are a plurality of annular rings disposed on a common axis or they may be spiral in form and extend from one end of the detector to the other end. These two sets of vanes constitute a multiplier somewhat similar in operation to that of the "pinwheel" type described in an article in the Proceedings of the Institute of Radio Engineers, July 1946 issue, page 424. These sets of vanes 3 and 4, will be referred to hereinafter as "deflectors."

Between discs 1 and deflector 3 is mounted a coarse screen grid 5 and between the deflector 2 and deflector 4 is mounted a similar grid 6. Grid 5 is kept at a positive potential with respect to discs 1 by electrical source 5e and grid 6 is kept at a positive potential with respect to deflector 3 by electrical source 6e. Outward radially from reflector 4 is anode 7, which is cylindrical in form. It is connected to the discs 1 through a current indicating device 8 and is kept at a positive potential with respect to deflectors 4 and 3 by electrical source 7e. The values of these biasing electrical sources are progressively greater outwardly from discs 1. Reflectors 3 and 4 and anode 7 must not only be biased positive with respect to discs 1 but anode 7 must be biased positive with respect to reflector 4 and reflector 4 must be biased positive with respect to reflector 3.

The embodiment shown in Figures 3 and 4 is similar to that shown in Figures 1 and 2, except that deflectors 3 and 4 are made of straight vanes that are mounted in planes parallel to the axis of the deflector. The vanes of the two sets are mounted at angles to each other, as shown more clearly in Figure 4. Also, the anode 7, as a unit, is made in sections, as indicated in Figure 3, each section having its own current indicator, 8a, 8b, 8c, 8d, 8e and 8f connected, respectively, to the discs 1.

In operation, when a high voltage particle, represented by arrow 9, strikes the series of discs 1, it penetrates several of the discs according to its velocity or energy. The number of secondary electrons emitted from individual discs will depend upon the velocity of the particle at the time of striking or penetration and the angle of incidence to the disc. The higher the velocity and the less the angle of incidence, the less the number of secondary electrons that are emitted, per impact. When the velocity is high and the particle strikes normal to the discs, the particle is particularly ineffective and causes practically no secondary emission. However, when a plurality of discs have been penetrated, the velocity of the particle is reduced until, when practically all the energy has been spent, the secondary emission per particle penetration increases rapidly and may reach as high as 4 or 5 per disc. It will be apparent that in the arrangement disclosed, use is made of the secondary electrons emitted from both sides of the discs.

Upon emission of the secondary electrons, they are drawn, by the positive potential of screen 5, within the multiplier which consists of the deflectors 3 and 4. As the vanes in the two sets of deflectors are at angles to each other, the multiplier is practically opaque to the particles. Upon striking the vanes, further secondary emission occurs and the original secondary emission particles and subsequently secondary emitted particles are collected by anode 7. A typical path of an individual secondary emission electron leaving the surface of disc 1, is shown at point 10 in Figure 1. As illustrated in Figure 1, the single secondary electron leaving disc 1 causes two secondary electrons to be emitted and leave the vane in deflector 3.

The operation of the device shown in Figures 3 and 4 is the same as that disclosed and described in Figures 1 and 2 except that the number of discs that the particle penetrates may be determined by observing the currents collected by the individual anode sections 7, Figure 3. If the length and position of the arrow 10 indicates the depth into the detector that a particle has penetrated the detector, it is obvious that the current indicators connected to the individual anode sections opposite the arrow, will respond to the secondary emission electrons. The current indicators connected to the individual sections of anode 7 beyond the point of penetration will be unresponsive as no secondary electrons have been emitted in the spaces that affect these latter sections. The observation then of the response and nonresponse of the various current indicating devices 8 gives a direct indication of the depth of penetration of the particle and hence the velocity of the particle as it struck the first of discs 1. It is apparent that the sum of the responses of the divisions of anode 7 is an indication of the quantity of radiation striking the first of discs 1.

The device is mounted for universal movement in a conventional gimbal ring system (not shown) by pins 11, secured to insulators 12 which are fastened to anode 7 in any conventional manner.

The direction of movement of particles, especially those of high velocity, can be determined by moving the device about its gimbal mounting axes until the maximum response is obtained by the current indicator device 8.

While the number of secondary emitted electrons per penetrating particle decreases with a decrease in angles of incidence of the particles to the discs, the number of discs penetrated increases with a decrease in angles of incidence. The reason for this is that while the number of secondary electrons emitted per penetration of a disc decreases with a decrease in the angles of incidence of the particle to the disc, the overall number of secondary emitted electrons increases at small angles of incidence because a greater number of discs are penetrated by such a particle before it misses a succeeding disc in the series of discs and because as the velocity of a particle is decreased by successive penetrations, the number of secondary electrons emitted per penetration increases. By making the discs 1 relatively smaller in diameter and thinner, the device becomes more directionally critical.

I claim as my invention:

1. Apparatus for determining the quantity of nuclear particle radiation including: a series of secondary-emission charged-particle responsive means exposed to said radiation, a series of means progressively radially disposed with respect to said responsive means for multiplying and collecting said secondary particles, means for biasing said multiplying and collecting means in respect to said radiation responsive means, and means coupled to said collecting means and quantitatively responsive to said collected particles, the extent of response of said last-mentioned means being a measure of the quantity of radiation.

2. Apparatus for determining the quantity of nuclear particle radiation including: a series of secondary-emission charged-particle responsive means exposed to said radiation, means for multiplying said secondary particles, a series of means for collecting said multiplied secondary particles, means for biasing said collecting means in respect to said radiation responsive means, means for biasing more positive progressively outward from said responsive means the said multiplying and collecting means, and means connected to said collecting means and quantitatively responsive to said collected particles, the extent of response of said last-mentioned means being a measure of the quantity of radiation.

3. Apparatus for determining the direction of movement of nuclear particle radiation including: a series of secondary-emission charged-particle responsive means exposed to said radiation, means progressively radially removed from said responsive means for multiplying said secondary particles and means for biasing more positive progressively outward from said charged-particle responsive means the said multiplying means, means for collecting said multiplied secondary particles, means for biasing said collecting means in respect to said radiation responsive means, means connected to said collecting means and quantitatively responsive to said collected particles, and means for positioning the said radiation responsive means in space, the position in space of said radiation responsive means at the maximum response of said collected particle responsive means being an indication of the direction of said radiation.

4. Apparatus for determining the velocity of nuclear particle radiation including: a series of secondary-emission charged-particle responsive means exposed to said radiation, a series of means for multiplying and collecting said secondary particles positioned progressively radially removed from and adjacent said series of radiation responsive means, means for biasing said series of multiplying and collecting means with respect to said series of radiation responsive means, and means individually and quantitatively responsive to said particles collected by said series of collecting means, the number of units of the collected particle responsive means responding to said collected particles being a measure of the velocity of said radiation.

5. Apparatus for determining the velocity of nuclear particle radiation including: a series of secondary-emission charged-particle responsive means exposed to said radiation, means progressively radially removed from said responsive means for multiplying said secondary particles, a series of means for collecting said secondary particles positioned adjacent to said multiplying means and opposite to said series of radiation responsive means, means for biasing said series of collecting means with respect to said series of radiation responsive means and means for biasing more positive progressively outward from said radiation responsive means the said multiplying means and the said collecting means, and means individually and quantitatively responsive to said particles collected by said series of collecting means, the number of units of the collected particle responsive means responding to said collected particles being a measure of the velocity of said radiation.

6. Apparatus for determining the quantity, velocity and direction of movement of nuclear particle radiation comprising a series of secondary-emission charged-particle responsive means exposed to said radiation, a series of means for multiplying said secondary-emission particles positioned progressively radially outwardly from and opposite to and adjacent said series of radiation responsive means, a series of secondary emission collecting means uniformly radially disposed opposite to respective ones of said radiation responsive means and responsive to said multiplied particles, means for biasing said series of collecting means with respect to said series of radiation responsive means, means individually and quantitatively responsive to said particles collected by said series of collecting means, means for positioning the said responsive means in space, the position in space of said radiation responsive means at the maximum response of said series of collecting means being an indication of the direction of said radiation, the said maximum response being a measure of the quantity of said radiation and the number of responding units in said series of said particle collecting means being a measure of the velocity of said radiation.

7. Apparatus for determining the quantity, velocity and direction of movement of nuclear particle radiation comprising a series of secondary-emission charged-particle responsive means exposed to said radiation, means for multiplying said secondary-emission particles positioned progressively radially outwardly from and opposite to and adjacent said series of radiation responsive means, a series of means for collecting said secondary-emission particles uniformly radially positioned opposite to respective ones of said radiation responsive means and responsive to said multiplied particles, means for biasing said series of collecting means with respect to said series of radiation responsive means and means for biasing more positive progressively outward from said radiation responsive means the said multiplying means and said collecting means, means individually and quantitatively responsive to said particles collected by said series of collecting means, means for positioning the said responsive means in space, the position in space of said radiation responsive means at the maximum response of said series of collecting means being an indication of the direction of said radiation, the said maximum response being a measure of the quantity of said radiation and the number of responding units in said series of said particle collecting means being a measure of the velocity of said radiation.

8. Apparatus according to claim 1 wherein said series of secondary-electron-emissive means exposed to said radiation emit secondary electrons upon both impingement of and departure after traversal therethrough of said nuclear radiation.

9. Apparatus according to claim 8 wherein said series of secondary-electron-emissive means comprises a plurality of parallel disposed charged particle permeable elements.

10. Apparatus according to claim 9 wherein said permeable elements comprise thin metallic sheets centered on the axis of said apparatus, said elements being in planes substantially perpendicular to said axis.

11. Apparatus for detecting nuclear radiation comprising a relatively thin metallic element subjected to and permeable to said radiation and emissive of secondary electrons upon impingement of and departure after traversal therethrough of said radiation, and means responsive to said secondary electron emission.

ERNEST G. LINDER.

REFERENCES CITED

The following references are of record in the file of this patent:

UNITED STATES PATENTS

| Number | Name | Date |
| --- | --- | --- |
| 2,102,045 | Thomas | Dec. 14, 1937 |
| 2,187,184 | Siebertz | Jan. 16, 1940 |

OTHER REFERENCES

Allen, Characteristics of Metal Type Electron-Multiplier Tube, United States Atomic Energy Commission document MDDC 275, 11 pp., March 1, 1944.

Allen, Physical Review, vol. 55, pp. 966–971, May 15, 1939.